(12) United States Patent  
Kaybidge et al.

(10) Patent No.: US 10,047,848 B2  
(45) Date of Patent: Aug. 14, 2018

(54) SHEAVE WITH STRUCTURED WEB

(71) Applicant: National Oilwell Varco, L.P., Houston, TX (US)

(72) Inventors: Reece William Kaybidge, Sprucegrove (CA); Li Liu, Edmonton (CA)

(73) Assignee: National Oilwell Varco, L.P., Houston, TX (US)

( * ) Notice: Subject to any disclaimer, the term of this patent is extended or adjusted under 35 U.S.C. 154(b) by 410 days.

(21) Appl. No.: 14/795,958

(22) Filed: Jul. 10, 2015

(65) Prior Publication Data

US 2016/0010744 A1    Jan. 14, 2016

Related U.S. Application Data

(60) Provisional application No. 62/023,047, filed on Jul. 10, 2014.

(51) Int. Cl.
  *F16H 55/20*  (2006.01)
  *F16H 55/50*  (2006.01)
  *F16H 57/01*  (2012.01)

(52) U.S. Cl.
  CPC ............. *F16H 55/50* (2013.01); *F16H 57/01* (2013.01)

(58) Field of Classification Search
  CPC .......... F16H 55/20; F16H 55/48; F16H 55/49; F16H 55/50; B66D 2700/026
  See application file for complete search history.

(56) References Cited

U.S. PATENT DOCUMENTS

| | | | |
|---|---|---|---|
| 432,701 A | 7/1890 | Grimm | |
| 639,762 A | 12/1899 | Painter | |
| 829,898 A | 8/1906 | Schultz | |
| 1,362,778 A * | 12/1920 | Castino | F16H 55/48 152/306 |
| 1,369,319 A * | 2/1921 | Bollen | F16H 55/50 192/138 |
| 2,730,795 A | 1/1956 | Bloss | |
| 2,806,380 A * | 9/1957 | Martin | H02G 1/04 254/134.3 PA |
| 3,292,908 A | 12/1966 | Thompson | |
| 3,385,563 A | 5/1968 | Stinson, Jr. | |
| 3,512,757 A | 5/1970 | Ostrom | |

(Continued)

FOREIGN PATENT DOCUMENTS

| CA | 2287676 | 6/2000 |
|---|---|---|
| DE | 3426802 | 2/1986 |

(Continued)

OTHER PUBLICATIONS

Extended European Search Report for related European Application No. 15156151.1 dated Aug. 3, 2015 (7 pages).

(Continued)

*Primary Examiner* — Emmanuel M Marcelo  
(74) *Attorney, Agent, or Firm* — Winthrop & Weinstine, P.A.

(57) ABSTRACT

A sheave may include a body portion with a circular circumference and defining a center plane, a bore extending through the body portion and configured for receiving a shaft and allowing the body portion to rotate in the center plane, and a rope groove arranged on the circular circumference, wherein the body portion comprises a structured profile.

20 Claims, 11 Drawing Sheets

(56) References Cited

U.S. PATENT DOCUMENTS

| | | | |
|---|---|---|---|
| 3,868,089 A | 2/1975 | Lindsey et al. | |
| 3,934,482 A | 1/1976 | Byers | |
| 4,018,422 A | 4/1977 | Bozeman, Jr. | |
| 4,177,685 A * | 12/1979 | DeLancey | F16H 55/48 403/362 |
| 4,301,995 A | 11/1981 | Niskin | |
| 4,413,981 A * | 11/1983 | White | F16H 55/50 474/175 |
| 4,480,818 A | 11/1984 | Frank | |
| 4,492,363 A | 1/1985 | Niskin | |
| 4,936,549 A * | 6/1990 | Ivanov | F16H 55/50 254/264 |
| 5,490,814 A * | 2/1996 | Whitenight | F16H 55/49 474/188 |
| 5,984,586 A | 11/1999 | Wudtke | |
| 6,041,476 A | 3/2000 | deNormand | |
| 6,105,939 A | 8/2000 | Vance et al. | |
| 6,881,166 B1 * | 4/2005 | Burkhardt | B61B 12/02 474/166 |
| 7,036,393 B2 * | 5/2006 | Sakamaki | F16H 55/17 74/443 |
| 7,175,163 B2 | 2/2007 | Blanc | |
| 7,798,471 B2 | 9/2010 | Christopher | |
| 8,398,057 B2 | 3/2013 | Tukachinsky | |
| 8,485,951 B1 | 7/2013 | Adams | |
| 8,973,901 B2 | 3/2015 | Roodenburg et al. | |
| 2004/0026676 A1 * | 2/2004 | Smith | B66B 15/04 254/393 |
| 2005/0037880 A1 * | 2/2005 | Yoshikawa | B66F 9/205 474/168 |
| 2006/0000058 A1 | 1/2006 | Robertson | |
| 2006/0231812 A1 | 10/2006 | Ziech et al. | |
| 2008/0115414 A1 | 5/2008 | Hogan | |
| 2008/0161141 A1 * | 7/2008 | Joo | F16H 55/48 474/8 |
| 2009/0291793 A1 * | 11/2009 | Marchesseault | F16H 55/50 474/166 |
| 2010/0133046 A1 | 6/2010 | Allwardt et al. | |
| 2011/0118067 A1 * | 5/2011 | Bronson | F16H 55/48 474/166 |
| 2012/0204851 A1 * | 8/2012 | McPherson | F41B 5/10 124/25.6 |
| 2014/0027691 A1 | 1/2014 | Ilaka et al. | |
| 2014/0291030 A1 | 10/2014 | Urquhart | |
| 2015/0083879 A1 * | 3/2015 | Hoffend, III | A63J 1/028 248/332 |

FOREIGN PATENT DOCUMENTS

| | | | |
|---|---|---|---|
| EP | 2447573 A1 * | 5/2012 | F16H 55/48 |
| GB | 261207 A * | 11/1926 | F16H 55/48 |
| GB | 285653 | 2/1928 | |
| WO | WO-2013038432 A1 * | 3/2013 | D06F 37/30 |

OTHER PUBLICATIONS

Screen shots from Google.com image search, Mar. 24, 2014 (1 page).

Shehab, Khaled Mohamed. "Traveling Block and Crown Sheaves", Drilling Ahead World Oilfield Network, Apr. 15, 2012, accessed on the Internet Mar. 24, 2014 URL: <http://www.drillingahead.com/group/hse-drilling/forum/topics/traveling-block-and-crown-sheaves> (15 pages).

* cited by examiner

SHEAVE WITH STRUCTURED WEB

CROSS-REFERENCE TO RELATED APPLICATIONS

The present application claims priority to U.S. Provisional Patent Application No. 62/023,047 filed on Jul. 10, 2014, entitled Sheave with Structured Web, the content of which is hereby incorporated by reference herein in its entirety.

FIELD OF THE INVENTION

The present application relates to a sheave for use in handling lines, ropes, cables, or other flexible elongate tensile elements. More particularly, the present application relates to a sheave that may be lighter weight than comparable capacity sheaves. Still more particularly, the present application relates to a sheave having a corrugated or fluted web, a staggered web, or a web having an otherwise strengthened cross-section.

BACKGROUND OF THE INVENTION

Lifting assemblies using handling lines, ropes, cables, or other flexible elongate tensile elements commonly rely on one or more sheaves or pulleys for guiding the line through a portion of the assembly. In some cases, for example, lifting assemblies found on cranes and other material handling systems may include crown blocks, travelling blocks, guides, or other portions configured to control the position of the line or cable. These devices may each include one or more sheaves for receiving and guiding the position of the line as it passes through and/or over the device and/or changes direction as it passes through the device. These sheaves may be designed to resist the forces from the line by receiving the radially imparted forces from the line and passing them through the web of the sheave to an axle, bearing, shaft, or other element passing through the center of the sheave. In light of the compressive nature of the forces passing through the web, the web may be a relatively thick element, particularly when portions closer to the center of the sheave are considered. Moreover, when sheave sizes become large (i.e., 60 inches, 72 inches, 100 inches, etc.), the relatively thin web may be subject to buckling.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

In some embodiments, a sheave may include a body portion with a circular circumference and defining a center plane. The sheave may include a bore extending through the body portion and configured for receiving a shaft and allowing the body portion to rotate in the center plane. The sheave may also include a rope groove arranged on the circular circumference. The body portion of the sheave may include a structured profile. The structured profile may allow for the use of a thinner body portion material than previously contemplated making for an efficient design and, in particular, a lighter weight design. In some embodiments, the structured profile may increase as the center of the sheave is approached to accommodate the higher bending stresses and the more concentrated compressive stresses near the center of the sheave. Several different structured profiles may be provided.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure, in some embodiments, relates to sheaves particularly designed to be light weight relative to known sheaves. The sheaves may be used in material handling systems or parts thereof such as crown blocks, travelling blocks, guides, or other devices configured to control and/or guide the position of a cable or line as it passes therethrough. In particular, the sheaves may include a wavy, corrugated, fluted, staggered, or otherwise structured web for increasing the flexural and/or compressive strength of the web for a particular thickness of web material. The structured web may increase the section modulus of the web by adjusting the geometry of the web and, as such, may be better capable of resisting high repetitive forces for a particular web thickness. Accordingly sheaves may be able to be reduced in weight by reducing the web thickness of the sheave.

Figure 1:
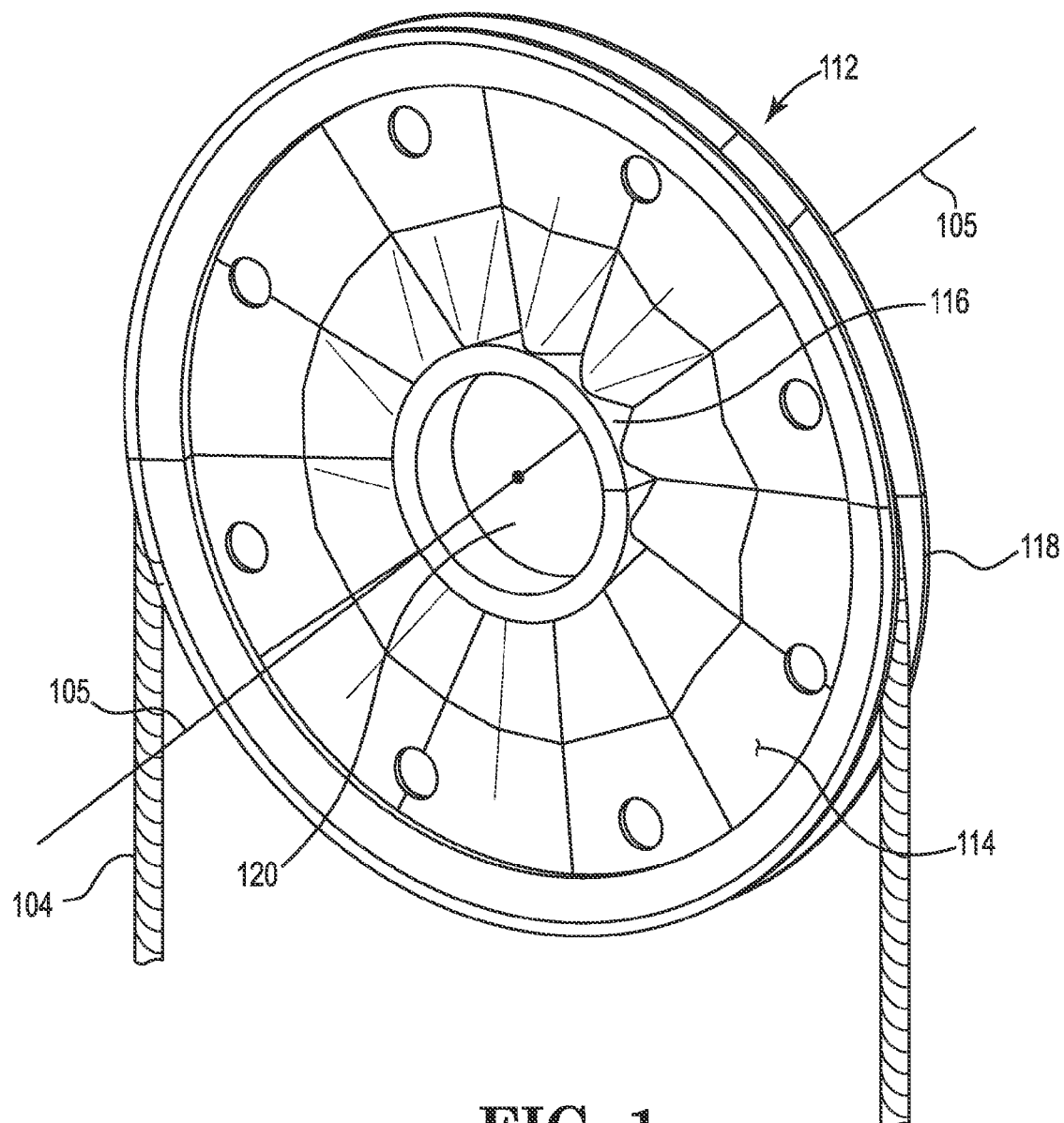
FIG. 1 is a perspective view of a sheave, according to some embodiments.

As shown in FIG. 1, a sheave 112 is shown. The sheave 112 may include a body portion or web 114, an axle engaging portion or hub 116, and a rope engaging portion or rim 118. As mentioned, the sheave 112 may be configured to guide a rope 104 passing through a device such as a crown or travelling block. The sheave 112 may be particularly adapted to maintain the rope 104 in a substantially constant tension condition as it passes through the block and may also be adapted to reduce or minimize kinking or abrupt bends in the rope 104, which can lead to high stress concentrations and may create areas of fatigue or wear on the rope 104.

Figure 2:
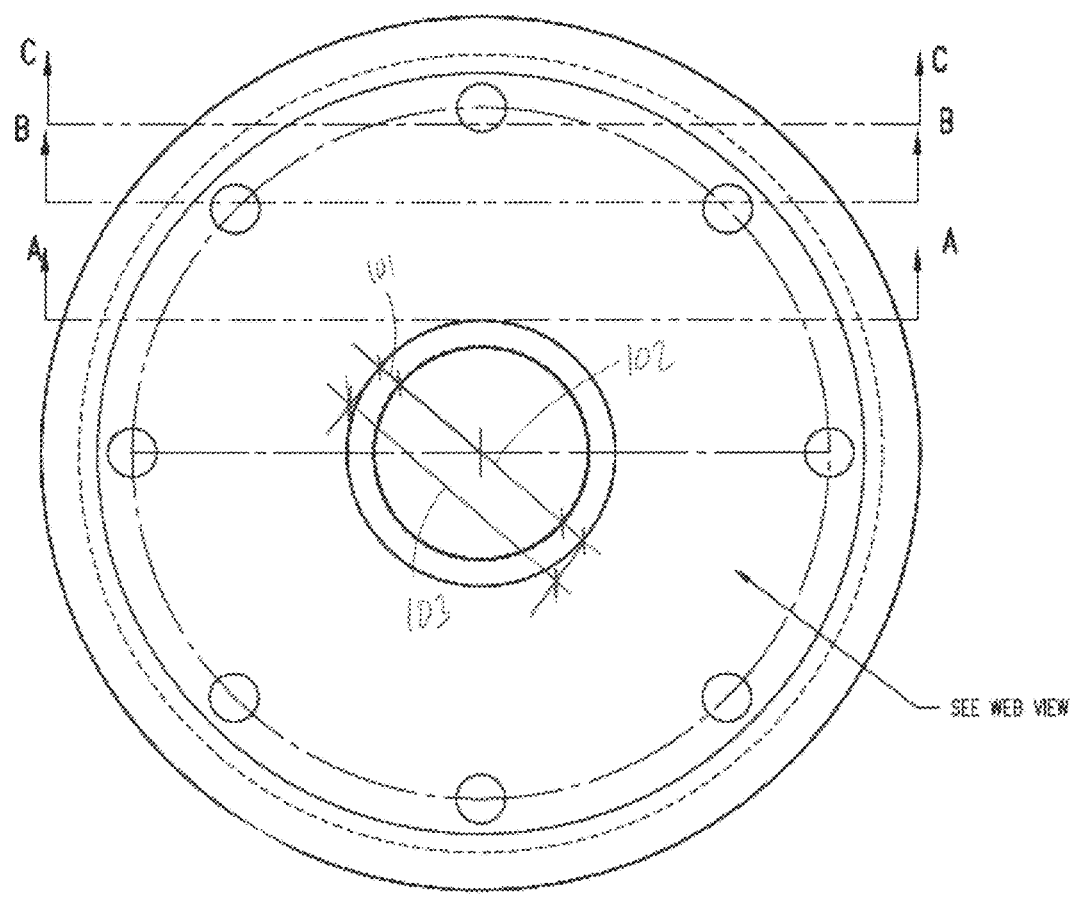
FIG. 2 is a side view of the sheave of FIG. 1.
Figure 3:
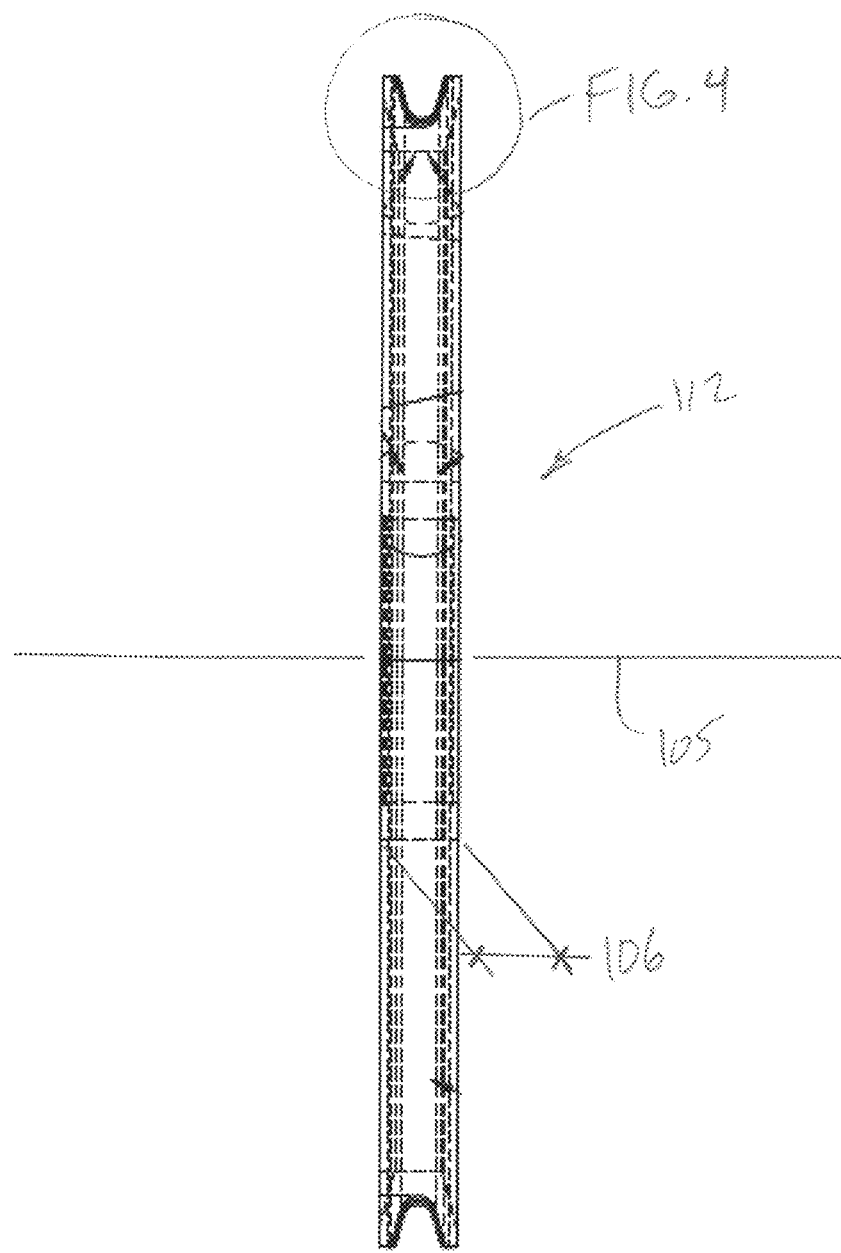
FIG. 3 is a full cross-section of the sheave of FIG. 1.

The axle engaging portion or hub 116 of the sheave 112 may be arranged immediately adjacent to the body portion 114 on an inner radial edge thereof. The hub 116 may function as a collector of inwardly acting radial forces and the hub may pass those forces on to a supporting shaft or spindle. In addition, the hub 116 may function as a fixed base for a body portion or web 114 that cantilevers away from the hub to the rope engaging portion 118 of the sheave. The hub 116 of the sheave 112 may, thus, include a thickened collar extending through the thickness of the sheave 112 and defining a substantially cylindrical bore 120 in which a bearing or other friction reducing element may be placed and secured. The bore 120 may be sized to house such a bearing and allow an axle or other shaft, rod, pin, or support structure to pass through the bearing. As shown in FIGS. 1-3, the hub 116 may be substantially cylindrical in shape having a thickness 101, an inner diameter 102, an outer diameter 103, and a length 106 measured along the rotational axis 105 of the sheave. The thickness 101 may be selected based on the loads the sheave is designed to withstand. In some embodiments, the thickness 101 may range from approximately ¼ inch to approximately 6 inches or from approximately 1 inch to approximately 4 inches or a thickness of approximately 2¼ A inches may be used. Still other thicknesses may be provided based on the anticipated loads and the geometry of the web material and the supporting shaft and/or bearing. The inner diameter 102 of the hub 116 may be selected to accommodate the supporting shaft and/or bearing and the outer diameter 103 may be defined by the inner diameter 102 in conjunction with the thickness 101 of the hub 116.

Depending on the nature of the body portion or web 114, the length 106 of the hub 116 along the rotational axis 105 of the sheave may be more or less substantial. For example, where the body portion 114 is an annular plate, the length of the hub 116 may be just slightly larger than the thickness of the web plate. However, where other geometries are provided for the web plate, a longer hub 116 length may be provided to accommodate a wider overall thickness for the web portion 114 of the sheave 112. In the embodiment shown in FIGS. 1-8, for example, the hub 116 may have a length 106 of approximately 0.25-10 inches or from approximately 2-6 inches or from approximately 4-5 inches or a length of approximately 4½ to 4⅞ inches may be provided. Still other hub 116 lengths within the ranges or outside the ranges mentioned may be provided.

The rope engaging portion or rim 118 of the sheave 112 may be arranged along an outer periphery of the body portion 114 opposite the axle engaging portion or hub 116. The rope engaging portion 118 may be adapted to cause the lifting line or rope 104 to conform to a selected shape (i.e., a radial arc shape) as it passes around the perimeter of the sheave 112. As such, and as shown in FIG. 2, the rope engaging portion 118 may include a generally circular shape when viewing the sheave 112 from the side. The diameter of the sheave 112 and, thus, the diameter of the rope engaging portion 118 may depend on several factors including the rope diameter, the design load, the block size or other device size, and several other factors. In some embodiments, the diameter of the rope engaging portion 118 (measured at outside or maximum diameter) may range from approximately 20 inches to approximately 114 inches or from approximately 40 inches to approximately 100 inches or from approximately 60 inches to approximately 80 inches. In other embodiments, other diameters may be provided.

Figure 4:
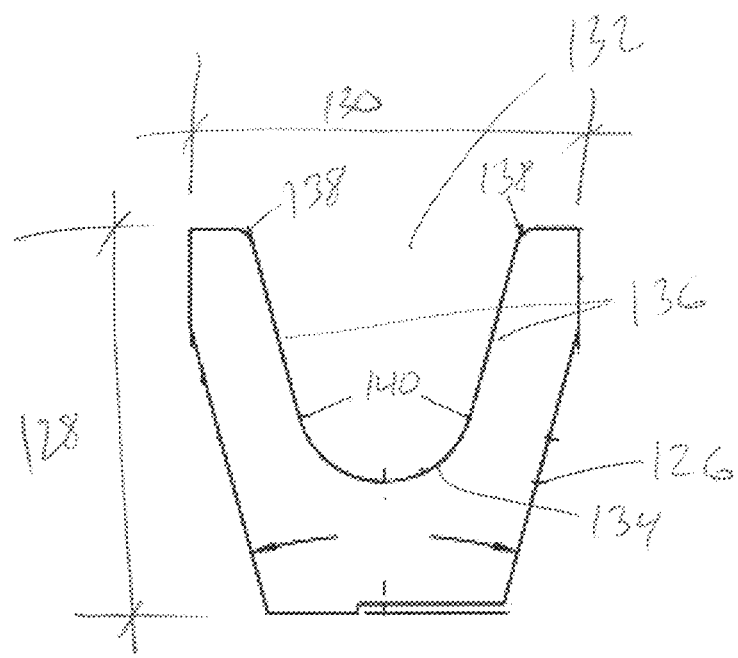
FIG. 4 is a close-up view of a portion of the cross-section of FIG. 3.

The rope engaging portion 118 may also be configured to cause the rope 104 to remain in alignment with a center plane of the sheave 112 as it passes around the sheave 112. This may be particularly useful as the fleet angle increases where sidewalls of the rope engaging portion 118 hold the rope generally centered on the sheave 112 as it passes around the sheave 112. As shown in FIG. 3 and close-up in FIG. 4, when viewed in cross-section, the rope engaging portion 118 may include a generally saddle or groove shape, for example. The rope engaging portion 118 may be defined by a base portion 126 extending around the periphery of the web 114. The base portion 126 may have a thickened region around the periphery of the web 114 of the sheave 112 or the base portion 126 may have a thickness similar or the same as the web 114. In the latter case, the base portion 126 of the rope engaging portion 118 may be an outer annular portion of the web 114, for example. In the embodiment shown, the base portion 126 is consistent with the former case where the base portion 126 includes a thickened region along the periphery of the web 114. As shown in FIG. 4, the thickened region may have a radial height 128 sufficient to accommodate a groove which may be sized and shaped to accommodate a selected rope diameter or range of diameters. For example, in some embodiments, the radial height 128 of the base portion 126 may range from approximately 2⅜ inches to approximately 5 inches. In other embodiments, other heights 128 may be provided. The thickened region may have a width 130 when viewed in cross-section for accommodating the rope diameter and providing sidewalls along the sides of the rope 104. For example, in some embodiments, the width 130 may range from approximately 2⅜ inches to approximately 4½ inches. In other embodiments, other widths 130 may be provided As shown, the base portion 126 may include a groove 132 that is particularly configured to receive a circular diameter rope 104 and may provide a seat for the rope as it lays on the outer peripheral surface of the sheave 112. In particular, the groove 132 may be defined by a bottom surface 134 and a pair of opposing sidewalls 136 each extending upwardly from the bottom surface 134 to respective lips 138.

The bottom surface 134 of the groove 132 may be adapted to nestably engage the lifting line or wire rope 104 as it presses against the sheave 112. The bottom surface 134 may thus be a concave surface extending between a pair of upper ends 140. The concave surface may have a curvature particularly adapted and modeled after the shape of the cross-section of the wire rope 104. In particular, the bottom surface 134 may have a curvature matching the curvature of the outer surface of the wire rope 104 or the curvature of the bottom surface 134 may be based on a radius slightly larger than the radius of the wire rope 104. For example, where the bottom surface curvature is too tight, the rope 104 may not fully engage the bottom surface 134 and may, instead, be hung up on the sidewalls 136 of the groove 132 causing excessive wear on the sidewalls 136 and pinching of the rope 104, which may cause the rope 104 to deteriorate. Where the bottom surface curvature is too broad, the rope 104 may have a tendency to flatten as it passes across the sheave 112, which may also cause the rope 104 to deteriorate more quickly. As such, the bottom surface curvature may be similar to the curvature of the outer surface of the wire rope 104. In some embodiments, the curvature may be defined by a radius that is based on the rope diameter multiplied by a factor ranging from approximately 1.01 to 1.2. In some embodiments, where the sheave groove 132 is designed to meet American Petroleum Institute (API) specifications, the factor may range from 1.06 to 1.1.

The bottom surface 134 may define an included angle defining how much of the bottom surface 134 comes into contact with the surface of the wire rope. In some embodiments, the bottom surface 134 may have an included angle ranging from approximately 0 degrees to approximately 60 degrees or from approximately 20 degrees to approximately 40 degrees or the included angle may be approximately 30 degrees. In some embodiments, where sheaves 112 are designed to meet specification of the API (e.g., API 8C), the included angle may be approximately 30 degrees or the angle subtended by the upper ends 140 may be approximately 150 degrees. Still other included angles may be provided depending on the shape, size, and type of rope or lifting line being provided. In any of the above cases, the angle relative to the horizontal of the upper end 140 of the bottom surface 134 may be approximately 90 degrees less ½ the included angle. That is, where the included angle is 30 degrees, for example, the upper ends 140 of the bottom surface 134 may extend upwardly at an angle of approximately 75 degrees from the horizontal. In addition, as shown, the bottom surface 134 of the groove 132 may be symmetrical about the centerline of the sheave 112 and, as such, the included angle may be made up of two half angles.

The sidewalls 136 of the groove 132 may be adjacent and/or immediately adjacent to the upper ends 140 of the bottom surface 134 and may extend upwardly from the upper ends of the bottom surface. As shown, the sidewalls 136 may initially be tangential to or in alignment with the upper ends 140 of the bottom surface 134 such that, initially, the sidewalls extend upwardly from the horizontal at the same angle as the upper ends of the bottom surface. In other embodiments, the sidewalls 136 might not be tangential and may, instead, extend at a shallower or more upright angle relative to the upper ends 140 of the bottom surface 134. Where sheaves are designed to meet API specifications, the sidewalls 136 may initially extend from the upper ends 140 of the bottom surface 134 tangentially as shown. While not the focus of the present disclosure, the sidewalls 136 of the groove 132 may also have a fleet angle tolerance feature where the sidewalls include curved or contoured sidewalls. That is, in contrast to groove profiles where the sidewalls 136 are flat and extend tangentially upwardly from the bottom surface 134, the sidewalls might not be flat and, instead may have a curved surface. The content of U.S. patent application Ser. No. 14/251,938 entitled Fleet Angle Tolerant Sheave, filed on Apr. 14, 2014 is hereby incorporated by reference herein in its entirety.

The body portion or web 114 of the sheave 112 may include a substantially robust structure configured for transferring tensile loads and/or lateral loads from the wire rope 104 to and through the axle engaging portion 116 of the sheave to an axle or supporting structure of the sheave. Where the rope engaging portion 118 of the sheave 112 is substantially circular, the tensile load in the wire rope 104 may impart a substantially uniform and radially acting pressure along the rope engaging portion.

In many sheaves, the web 114 may be a substantially planar structure that is substantially circular. That is, the web 114 may be substantially plate-like having a substantially constant thickness. In other cases, the thickness of the web 114 may be thicker near the center of the sheave 112 around the hub 116, for example. It is to be appreciated that a wire rope 104 passing around the sheave 112 may impart compressive forces on the web 114 but that lateral forces on the web are also present. Where the web 114 is a plate-like material and the lateral force is present at the outer perimeter of the sheave 112, the bending forces present in the web increase as the center of the sheave is approached. Due to the relatively small section modulus of a plate, the bending stresses at the base of the web 114 and in the weld material securing the web to the hub 116 can be very high. When such loads are experienced by the sheave 112 in a repeating fashion, issues of fatigue in the base of the web 114 and in the weld material can become problematic.

Figure 5:
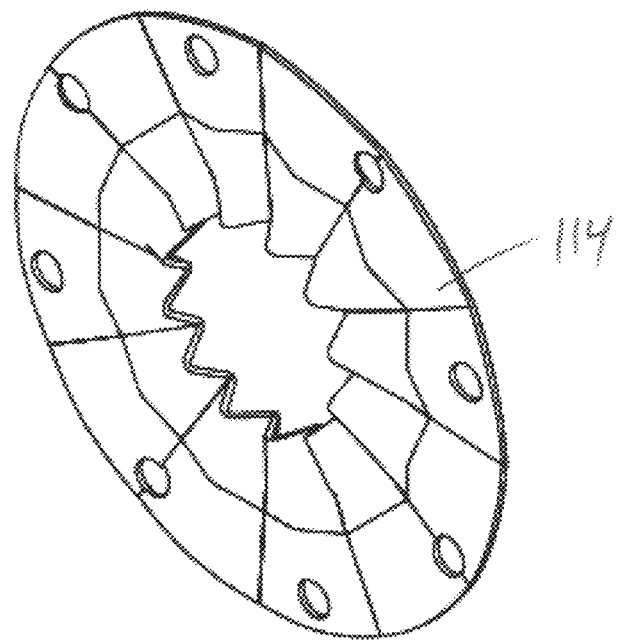
FIG. 5 is a perspective view of a web portion of the sheave of FIG. 1.

In some embodiments as shown in the figures of the present application, the thickness of the web portion may be reduced and/or its strength increased by providing a profile other than a flat, plate-like web. For example, as shown in FIGS. 1 and 5, the web portion 114 may include a wavy, fluted, corrugated, or otherwise structured web. As another example, as shown in FIGS. 12-16, the web portion 514 may include a staggered or stepped structured web. These structured shapes may increase section modulus of the web thereby reducing the magnitude of the bending stresses experienced by the web and reducing issues of fatigue in the web portion. That is, the web may act as a continuous cantilevered column or a cantilevered wall that cantilevers outwardly from the hub to the rope engaging portion. In this cantilevered condition, the web may receive and transfer forces through compression and bending from the rope-engaging portion to the hub. In the case of a plate-like web, the web may be relatively tall and skinny causing the web to be subject to high repeated bending stresses near the base of the web. Moreover, due to the annular shape of the web and the converging space within which the compressive and bending forces are distributed, the stresses in the web may increase as portions of the web closer to the hub are considered. By providing a profile other than a flat-plate profile, the section modulus of the web may be increased thereby increasing its resistance to out of plane bending and allowing it to better withstand repeated load and be less susceptible to fatigue.

Figure 8:
FIG. 8 is a cross-section view of a central radial portion of the web portion of FIG. 5 taken at A-A on FIG. 2.
Figure 9:
FIG. 9 is a cross-section view of a web of an alternative embodiment.
Figure 10:
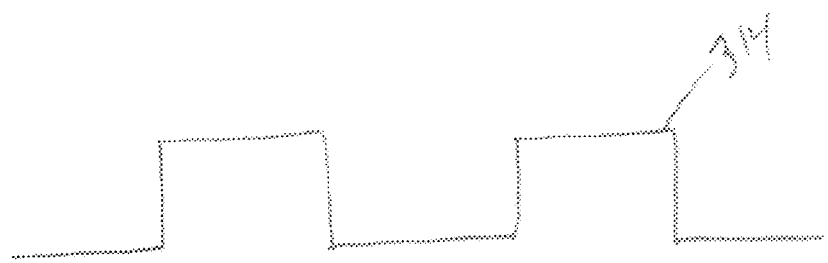
FIG. 10 is a cross-section view of a web of an alternative embodiment.
Figure 11:
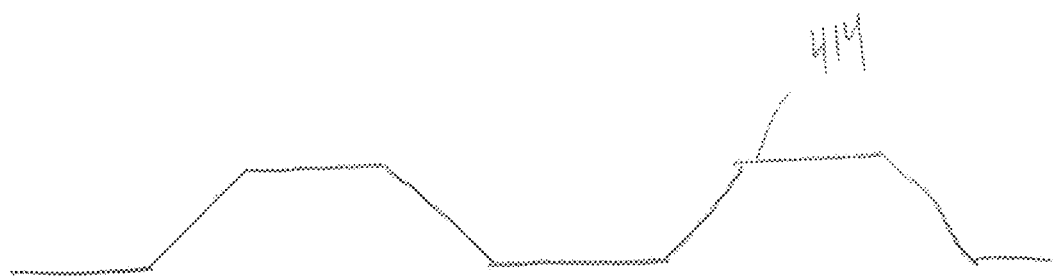
FIG. 11 is a cross-section view of a web of an alternative embodiment.

As mentioned, a structured web may include a web having a profile other than a fully flat-plate profile. For example, as shown, the structured web may have a triangular profile as shown in FIG. 8, for example. In other embodiments the structured web 214 may have a smooth wave profile, such as a sinusoidal wave, as shown in FIG. 9. In still other embodiments, the structured web 314 may have a rectangular profile as shown in FIG. 10. In still other embodiments, the structured web 414 may have a trapezoidal profile as shown in FIG. 11. Still other profiles including combinations in any number and form of the above listed profiles may be provided. Such profiles may increase the section modulus of the web when viewed in cross-section along a radial path of the web.

Figure 6:
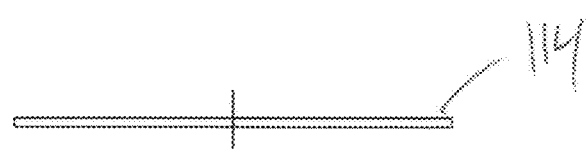
FIG. 6 is a cross-section view of an outer radial portion of the web portion of FIG. 5 taken at C-C on FIG. 2.
Figure 7:
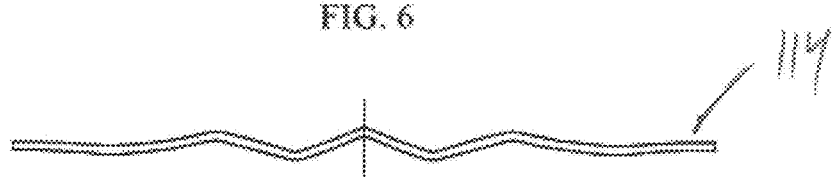
FIG. 7 is a cross-section view of a mid-radial portion of the web portion of FIG. 5 taken at B-B on FIG. 2.

In some embodiments, as shown in the progression of FIGS. 6-8, the amount of waviness or corrugation and, thus, section modulus may increase along a radial path from the outer periphery of the sheave to the hub. This approach may help to accommodate the increased bending stresses experienced by the web of the sheave as portions closer to the hub are considered. As shown in FIG. 6, which is a section taken at C-C on FIG. 2, a lesser amount of waviness or corrugation may be present near the outer radial portion of the web portion. At a mid-radial portion of the web portion; as shown in FIG. 7, which is a section taken at B-B on FIG. 2, a more pronounced waviness or corrugation may be provided. At a central radial portion, as shown in FIG. 8, which is a section taken at A-A on FIG. 2, a more pronounced and substantial waviness or corrugation may be provided. It is to be appreciated that while an increasing profile from the outside of the sheave to the inside of the sheave may be provided, a constant profile may also be provided.

Figure 12:
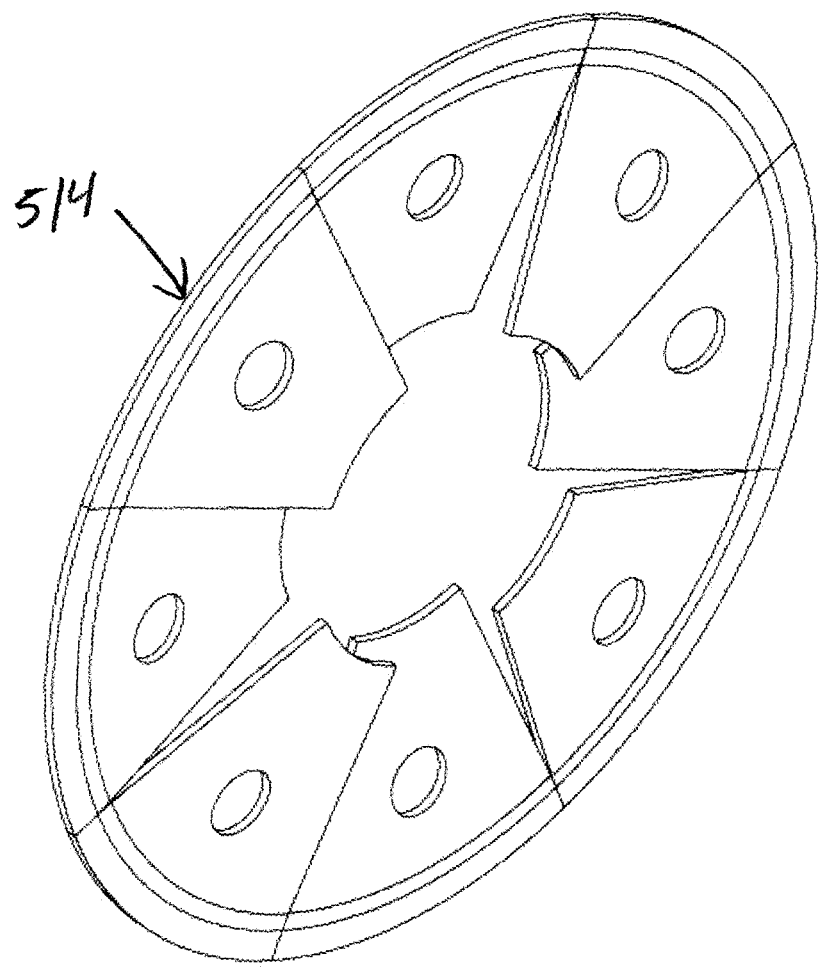
FIG. 12 is a perspective view of a web portion of a sheave, according to some embodiments.
Figure 13:
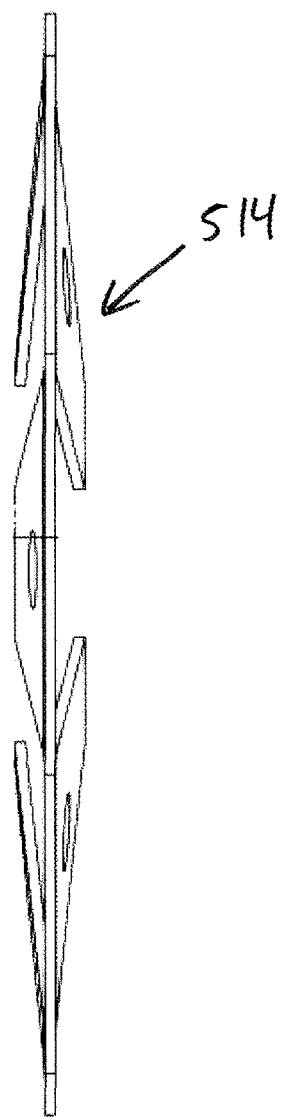
FIG. 13 is an end view of the web portion of FIG. 12.
Figure 14:
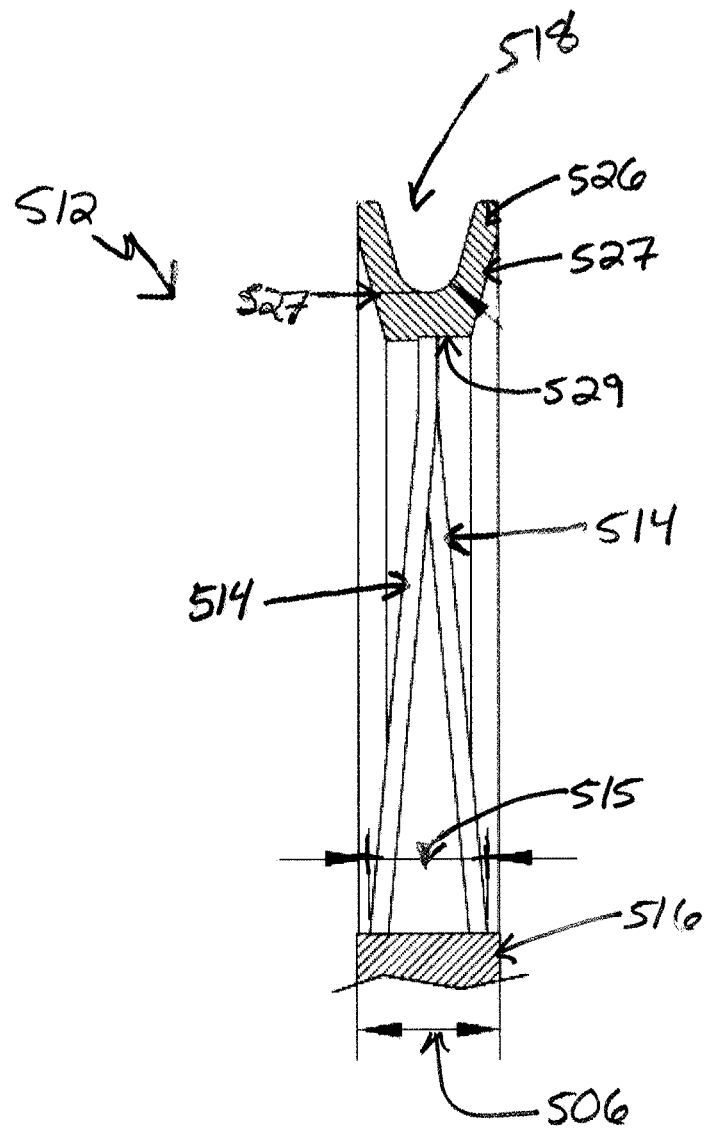
FIG. 14 is a cross-section of a portion of a sheave incorporating the web portion of FIG. 12.
Figure 15:
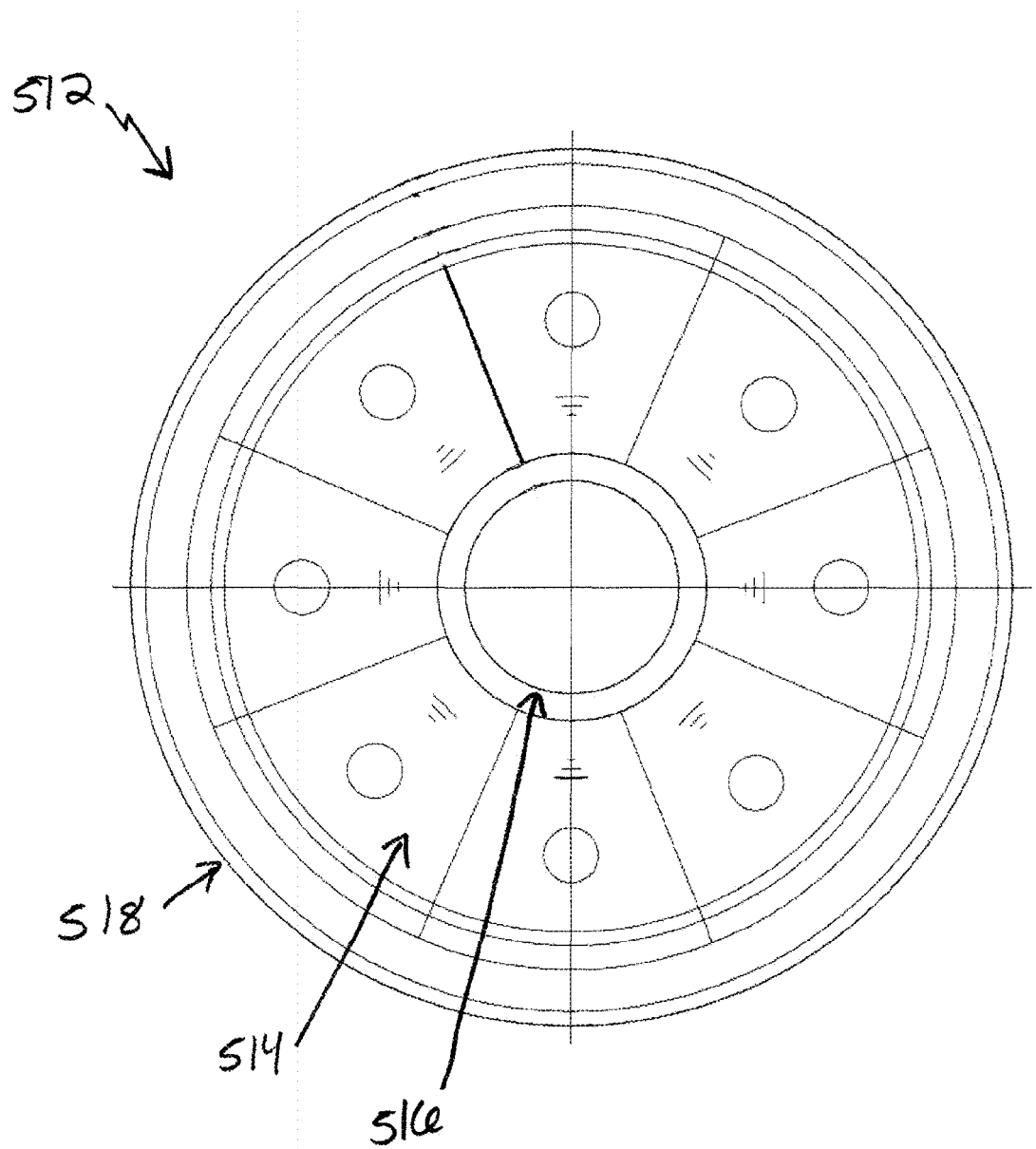
FIG. 15 is a side view of a sheave incorporating the web portion of FIG. 12.

Another example of a structured web having a web profile other than a fully flat-plate profile is shown in FIGS. 12-16. As shown in FIG. 12, a web 514 may have a staggered or stepped profile. That is, the web 514 may be divided into a plurality of radial sections, each section cantilevering away from the hub 516 toward the outer radial portion of the web. The web 512 may be divided into any suitable number of radial sections, and in some embodiments may be divided into 8 sections. As shown, in some embodiments, each radial section may cantilever at an angle as measured from the central plane defined by the body of the sheave 512. In some embodiments, the radial sections may cantilever at the same or differing angles, and at the same or differing directions toward the central plane defined by the body of the sheave 512. As shown in FIG. 13 for example, looking at an end view of the web 514, the radial sections may start at an offset location (i.e. offset from the central plane of the sheave 512) and cantilever toward the central plane of the sheave, such that every other section cantilevers from a first side of the central plane, and the opposing sections cantilever from a second side of the central plane of the sheave, and each converge toward the central plane as they approach the outer radial portion of the sheave. For example, and considering the radial section from the outside in, at an outermost portion of the web 514, the radial sections may be substantially in line with one another, and may become increasingly more separated as the radial sections progress toward an innermost portion of the web. Each radial section may cantilever at an angle toward the central plane at between approximately 0 degrees and approximately 45 degrees according to some embodiments. The angle may be between approximately 0 degrees and approximately 30 degrees, approximately 0 degrees and approximately 15 degrees, or approximately 0 degrees and approximately 10 degrees in other embodiments, for example. In other embodiments, each radial section may cantilever at any suitable angle. As shown in FIG. 14, radial sections of the web 514 may narrow in thickness, as measured along the rotational axis of the sheave 512. In some embodiments, radial sections of a web 514 may narrow in thickness as an alternative to cantilevering at an angle as measured from the central plane of the sheave 512. In other embodiments, radial sections may both narrow in thickness and cantilever at an angle. Likewise, in some embodiments, radial sections may cantilever at an angle while maintaining a constant thickness. In any of the three situations, the effect may be a web 514 with a staggered or stepped profile as shown in FIGS. 12-16.

FIG. 14 shows a cross sectional view of one half of the sheave 512 having the staggered web 514. As shown, the distance 515 between two adjacent radial sections may increase as the sections progress from the outermost portion of the web 514 nearest the rope engaging portion 518 toward the innermost portion of the web nearest the hub 516. At an innermost portion of the web 514, the center of two adjacent radial sections may be offset from one another a distance of from approximately 0 inches to approximately 8 inches, or may be offset a distance 515 of approximately 4 inches in some embodiments. In other embodiments, two adjacent radial sections may be offset from one another at any suitable distance 515. As additionally shown in FIG. 14, each radial section of the web 514 may abut with only a portion of the rope engaging portion 518 in some embodiments. For example, where the rope engaging portion 518 comprises a base portion 526 having a generally saddle or groove shape, as discussed above, with two outer sides 527 and a bottom surface 529, a radial section of the web 514 may abut the bottom surface 529. Alternatively, a radial section of the web 514 may abut one of the two outer sides 527 and a portion, such as half, of the bottom surface 529. In some embodiments, adjacent radial sections of the web 514 may abut opposing sides 527 of the base 526. In other embodiments, each radial section of the web 514 may abut any suitable portion of the base 526. Similarly, each radial section of the web 514 may abut a portion of the outer surface of the hub 516. As shown in FIG. 14, the hub 516 may have a length 506 measured along the rotational axis of the sheave 512 long enough to abut two adjacent radial sections of the web 514 and the gap between the radial sections that results from tapering and/or angled radial sections.

Figure 16:
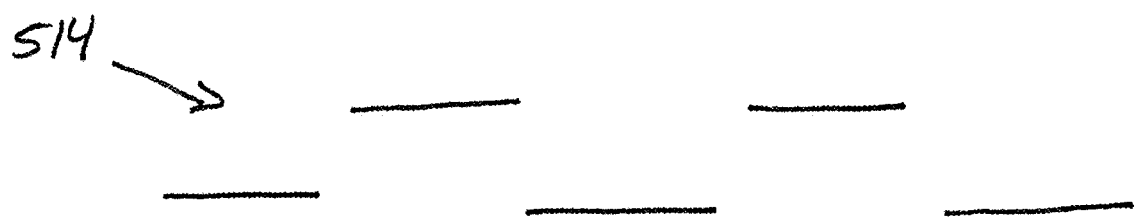
FIG. 16 is a cross-section view of the web portion of FIG. 12.

FIG. 16 shows a cross-section view of the web 514 having a stepped or staggered profile. As discussed, the distance from which the radial sections of a staggered web profile are separated from the central plane of the sheave 512 may increase along a radial path from the outer periphery of the sheave to the hub 516. This approach may help to accommodate the increased bending stresses experienced by the web of the sheave as portions closer to the hub are considered. In this way, the staggering or displacement between adjacent radial sections may be more pronounced at the innermost portion of the web 514 and less pronounced, with a smaller or no displacement, at the outermost portion of the web. It is to be appreciated that while an increasing profile from the outside of the sheave 512 to the inside of the sheave may be provided, a constant profile may be provided in some embodiments.

The various web designs described herein may allow for more efficient sheave designs and, in particular, lighter weight designs. For example, for a 72 inch diameter sheave, a common web thickness for a flat-plate design may range from approximately 1¼ inches to 1½ inches. Where a structured web is provided, the web thickness may surprisingly be decreased to approximately ⅝ inch, for example. This may result in a surprising weight decrease of the web of approximately 50% and a surprising overall weight decrease of the sheave of approximately 35%.

In addition to lighter weight, the modified web when compared a flat plate sheave may have a reduced rotational inertia because in addition to being lighter, relatively more material of the web is positioned closer to the hub, or in the case of a staggered web profile, the material is more broadly dispersed closer to the hub. That is, in the case of a wavy or corrugated web profile, because the profile may be relatively flat near the outer periphery of the sheave and the wavy portion, where more material is present, is located near the hub, the rotational inertia of the sheave may allow the sheave to rotate more easily or with less force. Similarly, in the case of a staggered web profile, because the profile may be relatively flat near the outer periphery of the sheave and the pronounced staggering portion, more broadly distributing the material of the web, is located near the hub, the rotational inertia of the sheave may allow the sheave to rotate more easily or with less force. This may be valuable or advantageous in allowing the sheave to turn more easily, thus, potentially reducing slippage between the rope and the sheave and reducing line wear and/or sheave groove wear. For example, for a sheave of the present disclosure having a 72 inch maximum diameter and a bore designed to receive a shaft with a 14 inch diameter, the mass moment of inertia may range from approximately 0.9 to approximately 1.2 million lb-in$^2$, depending wireline size. This is in contrast to more conventional similarly sized sheaves with flat plate webs that may have a mass moment of inertia of approximately 1.5 million to approximately 1.7 million lb-in$^2$, for example. Of course, sheaves of the present disclosure may have differing mass moments of inertia, depending on various design factors and sizes.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A sheave, comprising:
   a body portion with a circular circumference and defining a center plane;
   a bore extending through the body portion and configured for receiving a shaft and allowing the body portion to rotate in the center plane; and
   a rope groove arranged on the circular circumference, wherein, the body portion comprises a substantially continuous structured web having, when viewed in cross-section, a substantial structural profile near the bore and a diminishing structural profile as the web approaches the circular circumference.

2. The sheave of claim 1, wherein the structured profile extends substantially throughout a radial length of the body portion.

3. The sheave of claim 1, wherein the structured profile defines a section modulus and the section modulus increases as the body portion approaches the bore.

4. The sheave of claim 1, wherein the structured profile comprises a triangular profile.

5. The sheave of claim 1, wherein the structured profile comprises a smooth curve.

6. The sheave of claim 5, wherein the structured profile comprises a sinusoidal curve.

7. The sheave of claim 1, wherein the structured profile comprises a square profile.

8. The sheave of claim 1, wherein the structured profile comprises a trapezoidal profile.

9. The sheave of claim 1, wherein the structured profile comprises line segments at alternating heights.

10. The sheave of claim 1, wherein the structured profile comprises a combination of profile elements selected from triangular, smooth curve, square, trapezoidal, line segments with alternating heights, and straight profiles.

11. A sheave, comprising:
    a body portion with a circular outer portion and an inner portion, the body portion having a circumference and defining a center plane, the body portion comprising a plurality of planar radial sections cantilevering from the inner portion to the outer portion and having a surface normal directed generally lateral to the center plane;
    a bore extending through the body portion and configured for receiving a shaft and allowing the body portion to rotate in the center plane; and
    a rope groove arranged on the circumference of the body portion.

12. The sheave of claim 11, wherein the rope groove comprises a body portion having a bottom surface, wherein the plurality of radial sections abut a portion of the bottom surface.

13. The sheave of claim 11, wherein the plurality of radial sections cantilever at an angle measured from the center plane.

14. The sheave of claim 13, wherein the radial sections cantilever from a point offset from the center plane on the inner portion and toward the center plane as the radial sections approach the outer portion, the radial sections alternating such that the point for each radial section is on an opposing side of the center plane when compared to a corresponding point for an adjacent section.

15. The sheave of claim 14, wherein the rope groove comprises a body portion having a bottom surface, wherein the plurality of radial sections abut a portion of the bottom surface.

16. A web for sheave, comprising:
    a body portion with a circular circumference and defining a center plane; and
    a bore extending through the body portion and configured for receiving a shaft and allowing the body portion to rotate in the center plane;
    wherein, the body portion comprises a substantially continuous structured web having, when viewed in cross-section, a substantial structural profile near the bore and a diminishing structural profile as the web approaches the circular circumference.

17. The web of claim 16, wherein the structured profile extends substantially throughout a radial length of the body portion.

18. The web of claim 16, wherein the structured profile defines a section modulus and the section modulus increases as the body portion approaches the bore.

19. The web of claim 16, wherein the structured profile comprises a triangular profile.

20. The web of claim 16, wherein the structured profile comprises a smooth curve.

* * * * *